(12) United States Patent
Narayanan et al.

(10) Patent No.: US 11,665,474 B1
(45) Date of Patent: May 30, 2023

(54) AUDIBLE DEVICE/PORT BEACON SYSTEM

(71) Applicant: Dell Products L.P., Round Rock, TX (US)

(72) Inventors: Padmanabhan Narayanan, Redmond, WA (US); Vamshidhar Varre, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/685,019

(22) Filed: Mar. 2, 2022

(51) Int. Cl.
*H04R 3/00* (2006.01)
*H04R 1/02* (2006.01)
*H04R 17/00* (2006.01)
*G06F 13/12* (2006.01)

(52) U.S. Cl.
CPC ............ *H04R 3/00* (2013.01); *G06F 13/122* (2013.01); *H04R 1/025* (2013.01); *H04R 17/00* (2013.01)

(58) Field of Classification Search
CPC .......... H04R 3/00; H04R 1/025; H04R 17/00; G06F 13/1122
USPC ........................................................ 381/386
See application file for complete search history.

(56) References Cited

U.S. PATENT DOCUMENTS

| | | | | |
|---|---|---|---|---|
| 2011/0260875 | A1* | 10/2011 | Aarts ...................... | G08B 3/02 340/384.1 |
| 2014/0376762 | A1* | 12/2014 | Lipman .............. | A61B 5/15117 381/388 |
| 2015/0117682 | A1* | 4/2015 | Fukami ................. | B06B 1/0253 381/190 |
| 2015/0312669 | A1* | 10/2015 | Song .................. | A61B 5/02438 381/74 |
| 2018/0253947 | A1* | 9/2018 | Muhsin ..................... | H04R 3/04 |
| 2020/0090634 | A1* | 3/2020 | Moran, Jr. ........... | G10K 11/162 |

\* cited by examiner

*Primary Examiner* — Sean H Nguyen
(74) *Attorney, Agent, or Firm* — Joseph Mencher

(57) ABSTRACT

An audible beacon system includes an audible beacon chassis. A port connector is included on the audible beacon chassis and is configured to connect to a port on a computing device. An audible beacon device is coupled to the audible beacon chassis. An audible beacon driver device is included in the audible beacon chassis, is accessible via the port connector, and is configured to drive the audible beacon device to cause the audible beacon device to generate an audible sound. A storage device is included in the audible beacon chassis, is accessible via the port connector, and includes information that is configured to allow a computing device that is connected to the port connector to access the audible beacon driver device and cause the audible beacon driver device to drive the audible beacon device.

20 Claims, 11 Drawing Sheets

AUDIBLE DEVICE/PORT BEACON SYSTEM

BACKGROUND

The present disclosure relates generally to information handling systems, and more particularly to providing an audible beacon for use in identifying a location of an information handling system and/or port on the information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, often require their location (and/or the location of one or more of their ports) to be identified to a user. Conventional switch devices sometimes utilize system Light Emitting Devices (LEDs) that are included on the switch chassis as "visual system beacons" that may be activated so that a user may identify the location of the switch device, as well as port LEDS that are located adjacent the ports on the switch device as "visual port beacons" that may be activated so that a user may identify the location of any of those ports (e.g., to connect or disconnect a transceiver device from a port). While such visual beacons can provide some assistance in locating switch devices and/or their ports, they suffer from a number of issues.

For example, in order for the visual beacons to be effective a user must have a "line-of-sight" to the visual beacon, a requirement that is often challenging in a crowded datacenter. Furthermore, even when a user has a "line-of-sight" to a visual beacon, adjacent switch devices may include system and/or port LEDs (e.g., that are being activated for non-visual-beacon purposes), and the user must determine which of the switch devices is the switch device they are attempting to locate. Further still, once a switch device is located, line-of-sight to port LEDs on the switch device may be unavailable due to, for example, inconvenient viewing angles to ports on a switch device (e.g., particularly for switch devices at the top or bottom of a rack), cabling extending from adjacent ports and obstructing the port LEDs, and/or other reasons that would be apparent to one of skill in the art in possession of the present disclosure. Finally, "light pollution" in a datacenter can make it difficult to distinguish the activation of visual beacons.

Switch device manufacturers and their hardware vendors spend a non-trivial amount of time and effort in developing, configuring, and testing hardware/Complex Programmable Logic Device (CPLD) subsystems and/or software/microcode that allow the system LEDs and port LEDs on switch devices to provide the visual beacon functionality discussed above, and conventional Network Processing Unit (NPU) vendor-driven LED microcontroller-based visual beacon configurations are relatively complex, with a non-trivial amount of development resources expended providing and updating system LEDs and port LEDs and the corresponding firmware that allows for the visual beacon operations discussed above. In addition to all the issues discussed above, a recent trend is to reduce the number of LEDs on (or remove LEDs entirely from) the switch device chassis, and in such cases the visual beacon functionality discussed above will be unavailable.

Accordingly, it would be desirable to provide a beacon system that addresses the issues discussed above.

SUMMARY

According to one embodiment, an Information Handling System (IHS) includes a port; an audible beacon system that includes: an audible beacon chassis; a port connector that is included on the audible beacon chassis and that is connected to the port; an audible beacon device that is coupled to the audible beacon chassis; an audible beacon driver device that is included in the audible beacon chassis and that is accessible via the port connector; and a storage device that is included in the audible beacon chassis and that accessible via the port connector; a processing system that is coupled to the port; and a memory system that is coupled to the processing system and that includes instructions that, when executed by the processing system, cause the processing system to provide an audible beacon control engine that is configured to: detect the connection of the audible beacon system to the port and, in response, access information in the storage device that identifies the audible beacon driver device; receive a beacon request; and drive, in response to receiving the beacon request, the audible beacon driver device to cause the audible beacon device to generate an audible sound.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
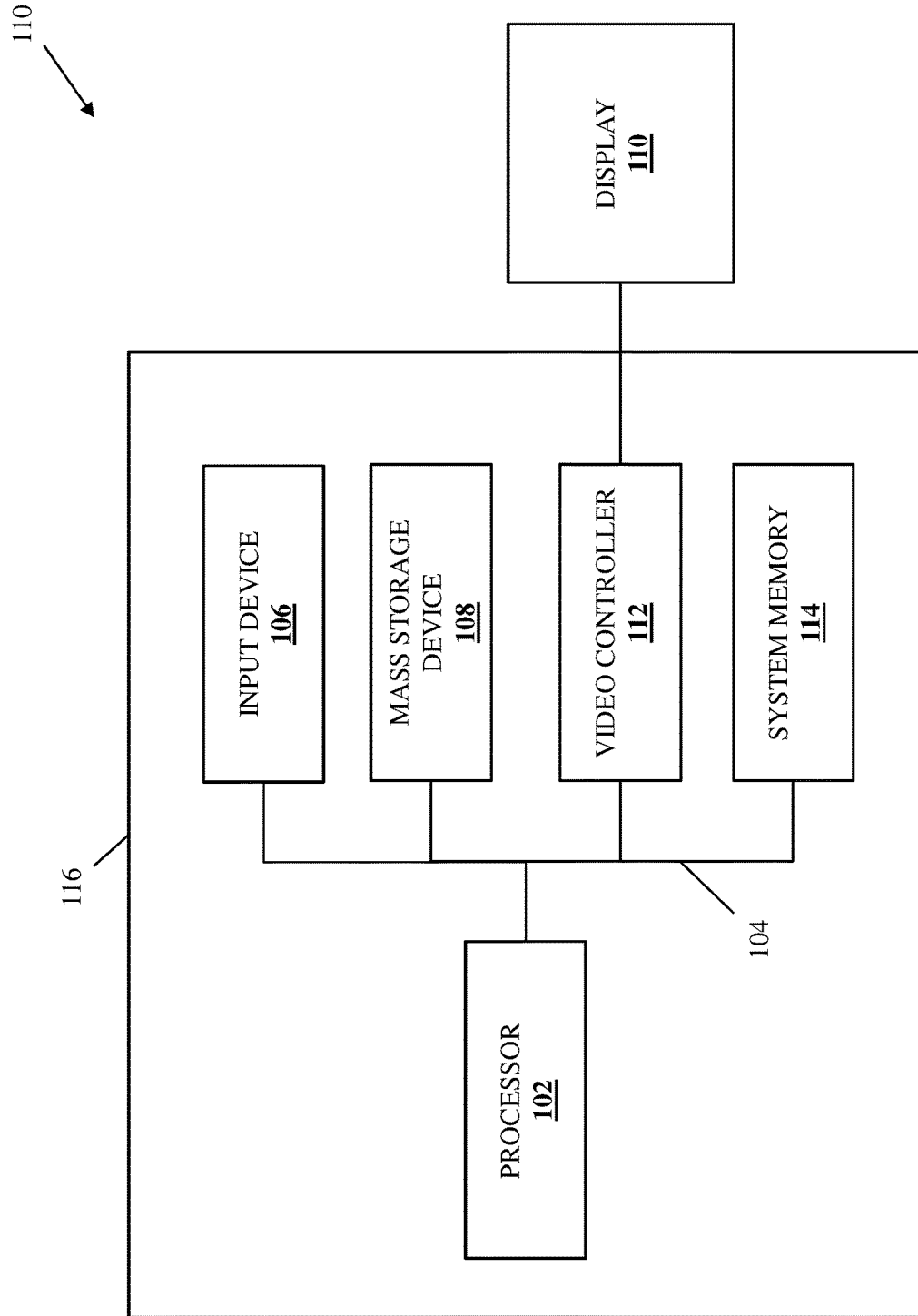
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
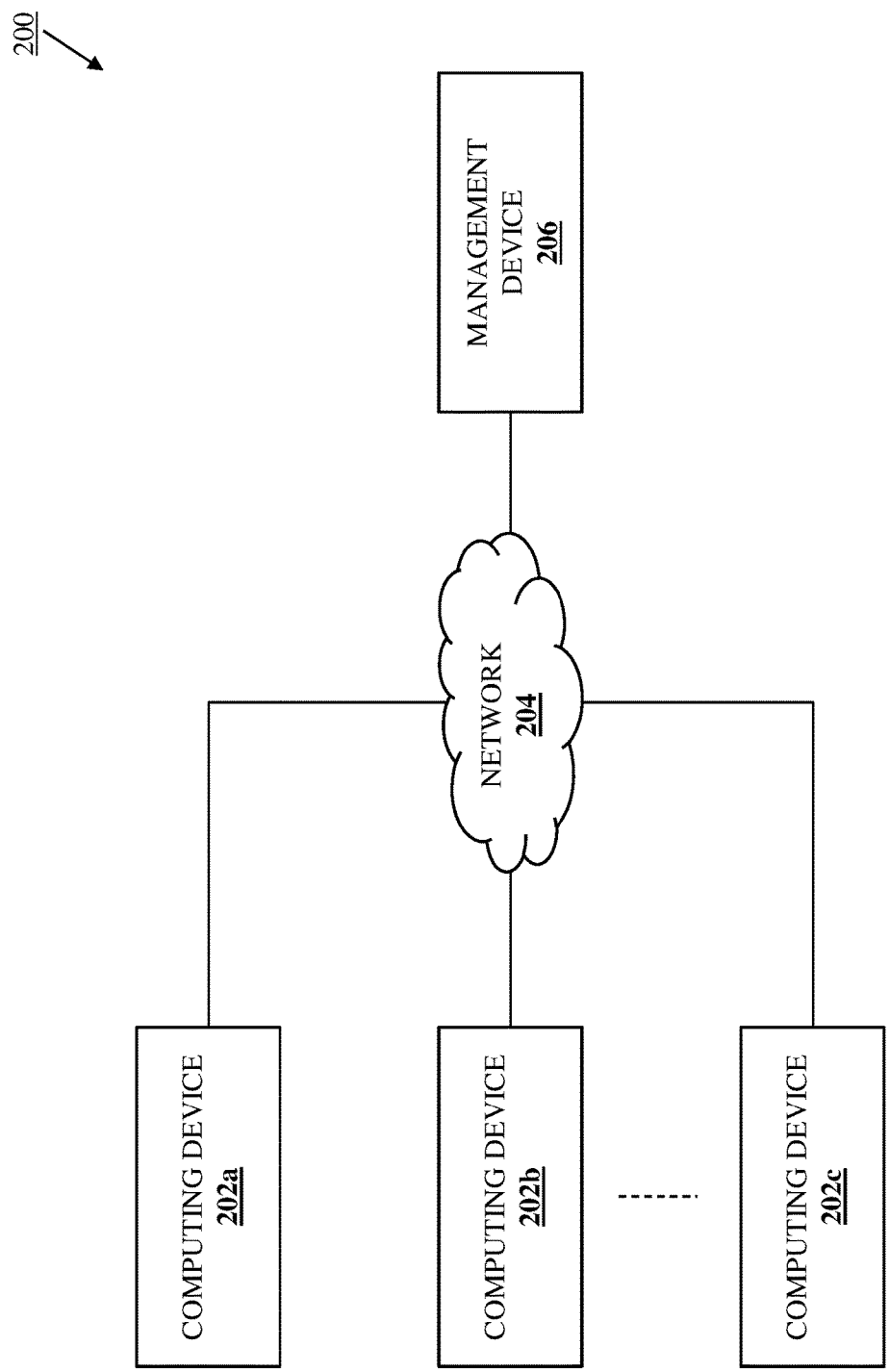
FIG. 2 is a schematic view illustrating an embodiment of a networked system that may include the audible beacon system of the present disclosure.

Referring now to FIG. 2, an embodiment of a networked system 200 is illustrated. In the illustrated embodiment, the networked system 200 includes a plurality of computing devices 202*a*, 202*b*, and up to 202*c*. In an embodiment, any of all of the computing devices 202*a*-202*c* may be provided by the IHS 100 discussed above with reference to FIG. 1, and/or may include some or all of the components of the IHS 100, and in the specific examples provided below are described as being provided by switch devices or other networking devices known in the art. However, while illustrated and discussed as being provided by switch devices or other networking devices, one of skill in the art in possession of the present disclosure will recognize that computing devices provided in the networked system 200 may include any devices (e.g., server devices, storage systems, etc.) that may be configured to operate similarly as the computing devices 202*a*-202*c* discussed below. Furthermore, while three computing devices 202*a*-202*c* are illustrated, one of skill in the art in possession of the present disclosure will recognize that many more computing devices may (and typically will) be included in the networked system 200 (e.g., in a datacenter) while remaining within the scope of the present disclosure. Each of the computing devices 202*a*-202*c* are coupled to a network 204 that may be provided by a Local Area Network (LAN), the Internet, combinations thereof, and/or other networks that would be apparent to one of skill in the art in possession of the present disclosure.

In the illustrated embodiment, management device 206 is coupled to the computing devices 202*a*-202*c* via the network 204. In an embodiment, the management device 206 may be provided by the IHS 100 discussed above with reference to FIG. 1, and/or may include some or all of the components of the IHS 100, and in specific examples may be provided by desktop computing devices, laptop/notebook computing devices, tablet computing devices, mobile phones, and/or other management devices that would be apparent to one of skill in the art in possession of the present disclosure. However, while illustrated and discussed as being provided by particular management devices, one of skill in the art in possession of the present disclosure will recognize that management devices provided in the networked system 200 may include any devices that may be configured to operate similarly as the management device 206 discussed below. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
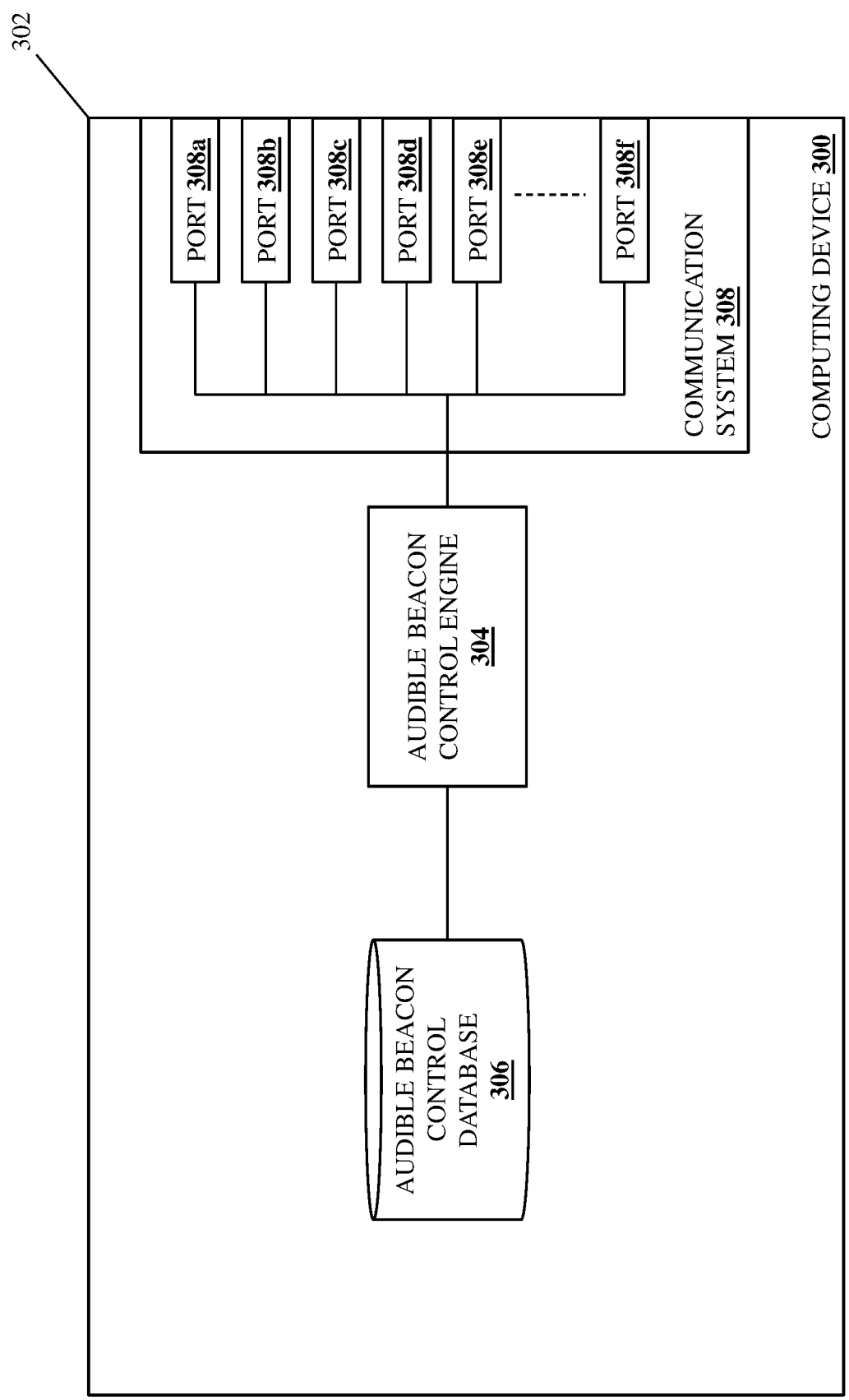
FIG. 3 is a schematic view illustrating an embodiment of a computing device that may be provided in the networked system of FIG. 2.

Referring now to FIG. 3, an embodiment of a computing device 300 is illustrated that may provide any or all of the computing devices 202*a*-202*c* discussed above with reference to FIG. 2. As such, the computing device 300 may be provided by the IHS 100 discussed above with reference to FIG. 1 and/or may include some or all of the components of the IHS 100, and in the specific examples below is described as being provided by a switch device and/or other networking devices known in the art. Furthermore, while illustrated and discussed as being provided by a switch device or other networking device, one of skill in the art in possession of the present disclosure will recognize that the functionality of the computing device 300 discussed below may be provided by other devices (e.g., server devices, storage systems, etc.) that are configured to operate similarly as the computing device 300 discussed below. In the illustrated embodiment, the computing device 300 includes a chassis 302 that houses the components of the computing device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an audible beacon control engine 304 that is configured to perform the functionality of the audible beacon control engines and/or computing devices discussed below.

The chassis 302 may also house a storage system (not illustrated, but which may include the storage 108 discussed above with reference to FIG. 1) that is coupled to the audible beacon control engine 304 (e.g., via a coupling between the storage system and the processing system) and that includes an audible beacon control database 306 that is configured to store any of the information utilized by the audible beacon control engine 304 discussed below. The chassis 302 may also house a communication system 308 that is coupled to the audible beacon control engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

For example, as illustrated, the communication system 308 may include a plurality of ports 308*a*, 308*b*, 308*b*, 308*d*, 208*e*, and up to 308*f*. In the specific examples below, the ports 308*a*-308*f* are provided by transceiver ports such as Small Form-factor Pluggable (SFP) transceiver ports, Quad SFP (QSFP) transceiver ports, and/or other transceiver ports that would be apparent to one of skill in the art in possession of the present disclosure. However, while particular transceiver ports are described, one of skill in the art in possession of the present disclosure will appreciate how the teachings of the present disclosure may be applied to other ports (e.g., Fibre-Channel ports, Ethernet ports, etc.) while remaining within it scope as well. Furthermore, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
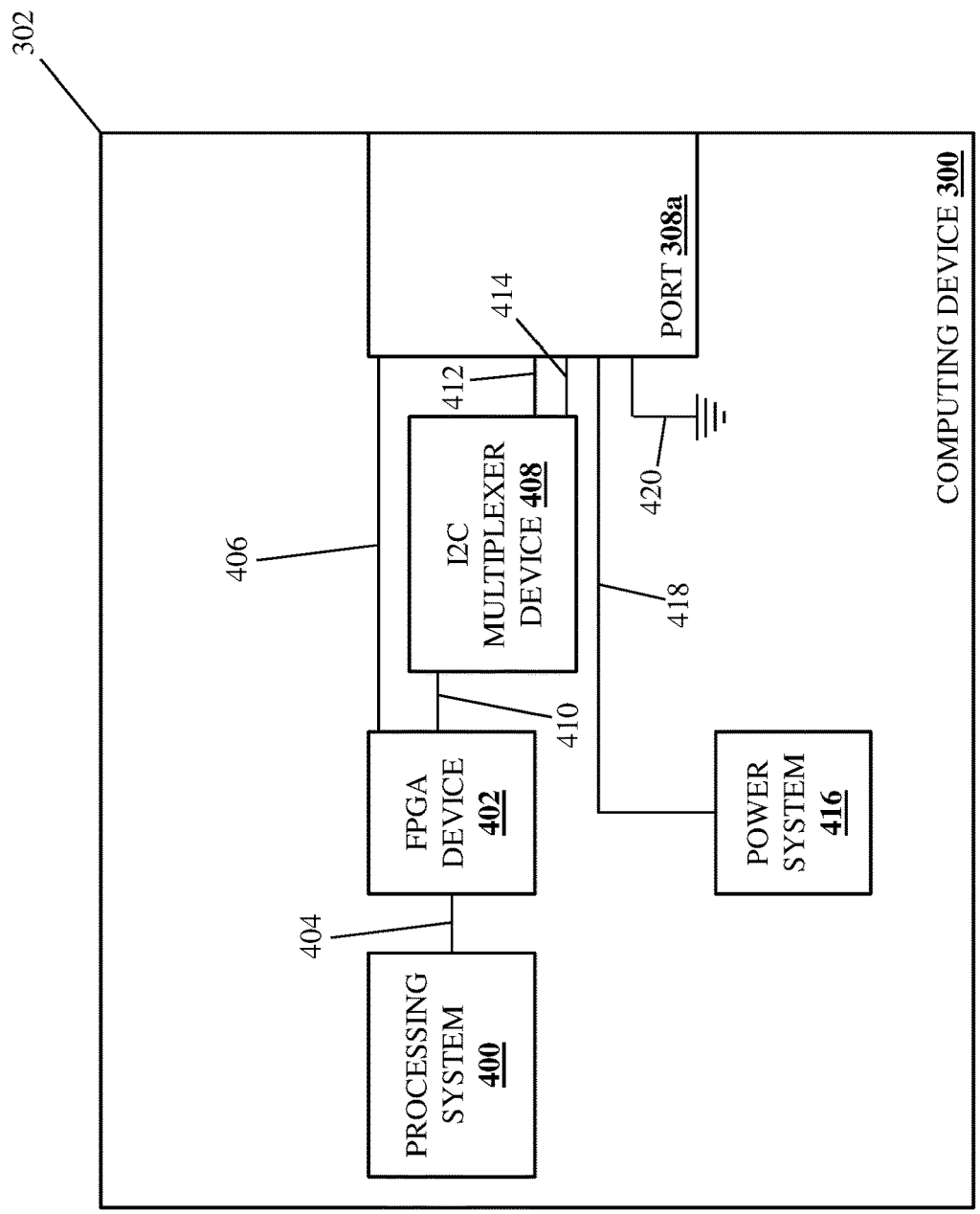
FIG. 4 is a schematic view illustrating an embodiment of the computing device of FIG. 3.

With reference to FIG. 4, a specific embodiment of the computing device 300 discussed above with reference to FIG. 3 is illustrated, with similar elements provided with the same reference numbers in FIGS. 3 and 4. In the embodiments illustrated and discussed below, the chassis 302 of the computing device 300 is illustrated including the port 308*a*, along with specific components that may provide for the audible beacon functionality discussed below. As such, one of skill in the art in possession of the present disclosure will appreciate how the components/component configurations illustrated in FIG. 4 as coupled to the port 308*a* may also be coupled to or otherwise provided for the other ports 308*b*-308*f* discussed above with reference to FIG. 3 while remaining within the scope of the present disclosure. Furthermore, while specific components/component configurations are illustrated in FIG. 4, other components/component configurations for providing the audible beacon functionality discussed below are envisioned as falling within the scope of the present disclosure as well.

In the illustrated embodiment, the computing device 300 may include a processing system 400, which may operate to provide the audible beacon control engine 304 discussed above with reference to FIG. 3, and which may be provided by a host Central Processing Unit (CPU), a Network Processing Unit (NPU), combinations thereof, and/or other processing systems that would be apparent to one of skill in the art in possession of the present disclosure. The processing system 400 is coupled to a Field Programmable Gate Array (FPGA) device 402, and that coupling may be provided by a Peripheral Component Interconnect express (PCIe) connection 404 and/or other couplings that would be apparent to one of skill in the art in possession of the present disclosure. The FPGA device 402 is coupled to the port 308*a*, and that coupling may be provided by a Module Present (ModPrsL)/Interrupt (IntL) connection 406 and/or other couplings that would be apparent to one of skill in the art in possession of the present disclosure. The FPGA device 402 is also coupled to an Inter-Integrated Circuit (I2C) multiplexer device 408 (e.g., an I2C multiplexer tree that may couple the FPGA device 402 and the processing system 400 to each of the ports 308*a*-308*f* discussed above with reference to FIG. 3), and that coupling may be provided by an I2C connection 410 and/or other couplings that would be apparent to one of skill in the art in possession of the present disclosure. The I2C multiplexer device 408 is coupled to the port 308*a*, and that coupling may be provided by a 2-wire serial interface clock (SCL) connection 412 and a 2-wire serial interface data (SDL) connection 414, and/or other couplings that would be apparent to one of skill in the art in possession of the present disclosure. The port 308*a* is also coupled to a power system 416 and ground, and that coupling may be provided by a power (Vcc) connection 418 and a ground (GND) connection 420, and/or other couplings that would be apparent to one of skill in the art in possession of the present disclosure.

Figure 5:
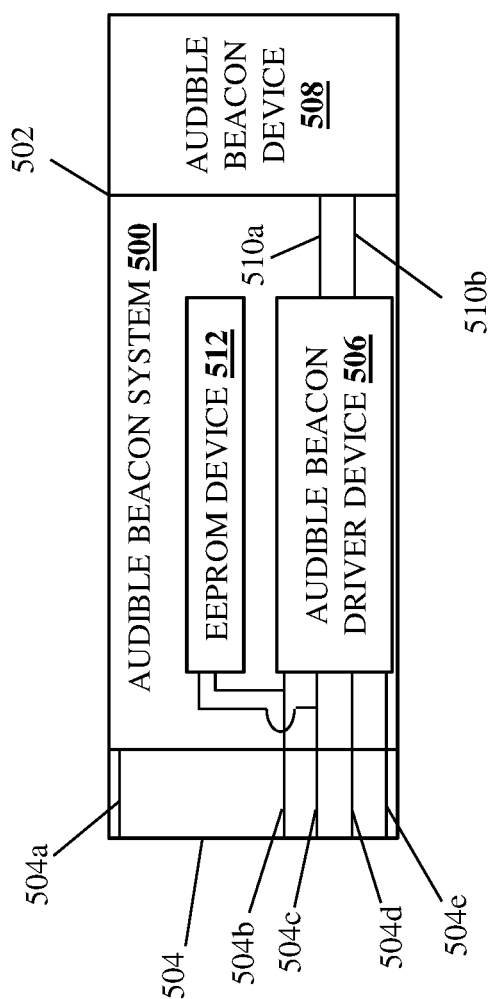
FIG. 5 is a schematic view illustrating an embodiment of an audible beacon system that may be connected to a port on the computing device of FIG. 3 or 4.

With reference to FIG. 5, an embodiment of an audible beacon system 500 is illustrated. As will be appreciated by one of skill in the art in possession of the present disclosure, the audible beacon system 500 provides an example of an audible beacon "port plug" that may be connected to a port to provide the audible beacon functionality of the present disclosure, while also operating to provide other benefits (e.g., similar to a "port dust plug" that prevents dust and/or other debris from entering the port) that would be apparent to one of skill in the art in possession of the present disclosure. As such, one of skill in the art in possession of the present disclosure will recognize that the audible beacon system 500 described herein includes control communications connections for allowing for control of the audible beacon system 500 by a computing device that includes a port to which the audible beacon system 500 is connected, but need not include data communication connections (e.g., serializer/deserialize (SerDes) connections, etc.) that might otherwise be provided on a transceiver device that is configured to connect to that same port.

The audible beacon system 500 includes an audible beacon chassis 502 that houses the components of the audible beacon system 500, only some of which are illustrated and discussed below. In an embodiment, the audible beacon chassis 502 may include a transceiver chassis form-factor (e.g., the same form-factor as an SFP transceiver chassis, a QSFP transceiver chassis, etc.) In the illustrated embodiment, a port connector 504 is included on and extends from the chassis 502. For example, the port connector 504 may be provided by a transceiver connector such as, for example, an SFP transceiver connector, a QSFP transceiver connector, and/or other transceiver connectors that would be apparent to one of skill in the art in possession of the present disclosure. However, while particular transceiver connectors are described, one of skill in the art in possession of the present disclosure will appreciate how the teachings of the present disclosure may be applied to other connectors (e.g., Fibre Channel connectors, Ethernet connectors, etc.) while remaining within the scope of the present disclosure as well. In the illustrated embodiment, the port connector 504 includes a plurality of connector elements that include a Module Present (ModPrsL) connector element 504a, 2-wire serial interface clock (SCL) connector element 504b, a 2-wire serial interface data (SDL) connector element 504c, a power (Vcc) connector element 504d, and a ground (GND) connector element 504e.

The audible beacon chassis 502 houses an audible beacon driver device 506 that, in some specific examples provided below, is provided by a piezoelectric audio device driver that is connected to the SCL connector element 504b, the SDL connector element 504c, the Vcc connector element 504d, and the GND connector element 504e on the port connector 504. However, while described as a particular audible beacon driver device connected to particular connector elements on the port connector 504, one of skill in the art in possession of the present disclosure will appreciate how different audible beacon driver devices and/or couplings will fall within the scope of the present disclosure as well. In the illustrated embodiment, an audible beacon device 508 is included on and extends from the chassis 502, and in some examples is provided by a piezoelectric audio device (e.g., a piezoelectric "buzzer") that is connected to the audible beacon driver device 506 by a signal connection 510a and a ground connection 510b. To provide a specific example, the audible beacon device 508 may be provided by a piezoelectric buzzer encased in an acrylic or glass material enclosure, although one of skill in the art in possession of the present disclosure will appreciate how other piezoelectric audio device configurations will fall within the scope of the present disclosure as well. Furthermore, while described as a particular audible beacon device connected to the audible beacon driver device 506 via particular connections, one of skill in the art in possession of the present disclosure will appreciate how different audible beacon devices and/or couplings will fall within the scope of the present disclosure as well.

The audible beacon chassis 502 also houses a storage device that, in the illustrated embodiments, is provided by an Electronically Erasable Programmable Read-Only Memory (EEPROM) device 512 that is connected to the SCL connector element 504b and the SDL connector element 504c on the port connector 504. However, while described as a particular storage device connected to particular connector elements on the port connector 504, one of skill in the art in possession of the present disclosure will appreciate how different storage devices and/or couplings will fall within the scope of the present disclosure as well. As discussed in further detail below, the EEPROM device 512 may store a plurality of information associated with the audible beacon system 500 and/or its use (e.g., rather than optic/Direct Attach Copper (DAC) capabilities that are typically provided in the EEPROM device of transceiver devices). For example, the information stored in the EEPROM device 512 may identify the audible beacon system 500 as a device with audible beacon functionality (e.g., as opposed to conventional transceiver devices that may be connected to the same types of ports as discussed above). Furthermore, the information stored in the EEPROM device 512 may include a vendor name, an Organization Unique Identifier (OUI), a part number, a revision identifier, a serial number, etc. Further still, the information stored in the EEPROM device 512 may be included in vendor specific fields and may indicate a type of the audible beacon device 508 (e.g., an active or passive audible beacon device).

Further still, the information stored in the EEPROM device 512 may be configured to identify an audible beacon driver device type of the audible beacon driver device 506, as well as an address (e.g., an I2C address) of the audible beacon driver device 506. To provide a specific example, in embodiments in which the audible beacon device 508 is an active piezoelectric audio device, the audible beacon driver device type of the audible beacon driver device 506 may be an I2C expander device, a General Purpose Input/Output (GPIO) expander device, and/or other types of audible beacon driver devices that would be apparent to one of skill in the art in possession of the present disclosure. To provide another specific example, in embodiments in which the audible beacon device 508 is a passive piezoelectric audio device, the audible beacon driver device type of the audible beacon driver device 506 may be a microcontroller device, which one of skill in the art in possession of the present disclosure will recognize may be configurable to generate particular tones, patterns, and/or other audible sounds using the audible beacon device 508. However, while a particular audible beacon system 500 has been described, one of skill in the art in possession of the present disclosure will appreciate how the audible beacon system of the present disclosure may include other components and/or component configurations while remaining within the scope of the present disclosure as well.

Figure 6:
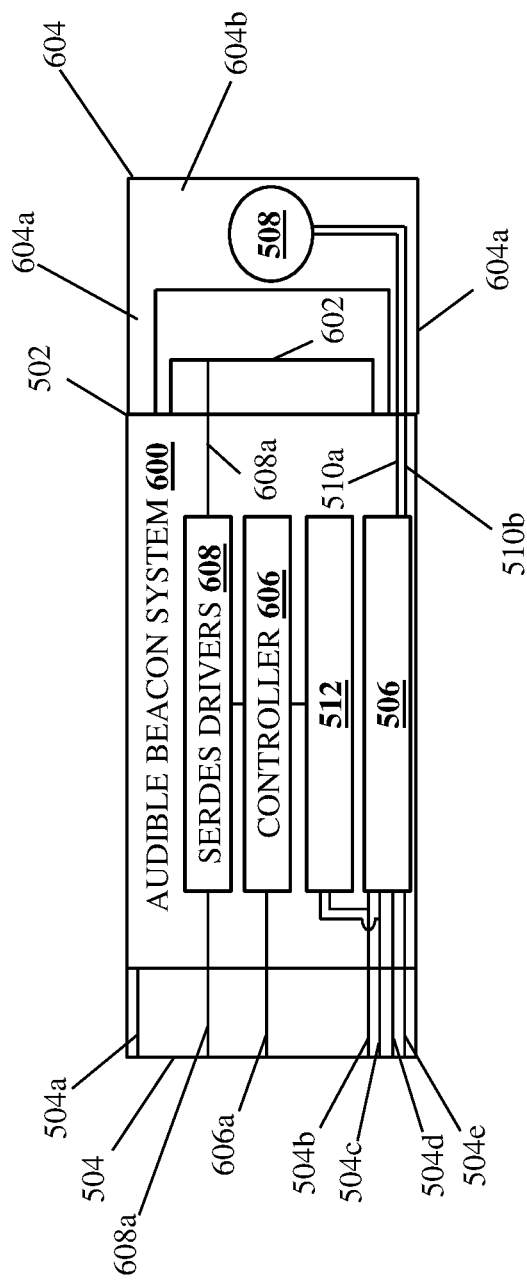
FIG. 6 is a schematic view illustrating an embodiment of an audible beacon system that may be connected to a port on the computing device of FIG. 3 or 4.

With reference to FIG. 6, another embodiment of an audible beacon system 600 is illustrated that is similar to the audible beacon system 500 discussed above, with similar components having similar reference numbers in FIGS. 5 and 6. As will be appreciated by one of skill in the art in possession of the present disclosure, the audible beacon system 600 provides an example of an audible beacon transceiver device that combines the audible beacon functionality of the present disclosure with a transceiver device. As such, one of skill in the art in possession of the present disclosure will recognize that the audible beacon system 600 utilizes both control communications connections for allowing for control of the audible beacon system 600 by a computing device that includes a port to which the audible beacon system 600 is connected, and includes data communication connections (e.g., serializer/deserialize (SerDes) connections) that allows for transceiver functionality. Furthermore, while the discussion below focuses on the operation of the audible beacon system 500 discussed above with reference to FIG. 5, one of skill in the art in possession of the present disclosure will appreciate that the audible beacon system 600 may operate in substantially the same manner while providing transceiver functionality as well.

The audible beacon system 600 includes the audible beacon chassis 502, and the port connector 504 that includes the ModPrsL connector element 504a, the SCL connector element 504b, the SDL connector element 504c, the Vcc connector element 504d, and the GND connector element 504e, as discussed above in more detail with reference to FIG. 5. The audible beacon chassis 502 also houses the audible beacon driver device 506 that is connected to the SCL connector element 504b, the SDL connector element 504c, the Vcc connector element 504d, and the GND connector element 504e, as discussed above in more detail with reference to FIG. 5. The audible beacon chassis 502 also houses the EEPROM device 512 that is connected to the SCL connector element 504b and the SDL connector element 504c, as discussed above in more detail with reference to FIG. 5. As will be appreciated by one of skill in the art in possession of the present disclosure, in addition to the information discussed above with reference to the audible beacon system 500, the EEPROM device 512 in the audible beacon system 600 may include information describing the details of its transceiver functionality as well.

However, the audible beacon chassis 502 also includes a connector 602 that extends from the audible beacon chassis 502 opposite the audible beacon chassis 502 from the port connector 504. As will be appreciated by one of skill in the art in possession of the present disclosure, the connector 602 may be a transceiver connector that is configured to couple to cabling and/or other transceiver elements known in the art. However, while a particular connector is described, one of skill in the art in possession of the present disclosure will appreciate how a variety of connectors will fall within the scope of the present disclosure as well. A decoupling element 604 also extends from the audible beacon chassis 502 adjacent the connector 602, and includes a plurality of arms 604a that extend between the audible beacon chassis 502 and a handle 604b, with one of the arms 604a used to route the signal connection 510a and the ground connection 510b from the audio beacon driver device 506 to the audio beacon device 508. In an embodiment, the decoupling element 604 is provided by a "push/pull tab" on a transceiver device, and is configured to be actuated to decouple the transceiver device from a port when the transceiver device is connected to that port, although other decoupling elements are envisioned as falling within the scope of the present disclosure as well.

In the illustrated embodiment, the audible beacon chassis 502 also houses a controller 606 that may be provided by a System on Chip (SOC) that is coupled to the EEPROM device 512, and that may include an FPGA connection 606a to the port connector 504 that is configured to couple the controller 604 to the FPGA device 402 in the computing device 300 discussed above with reference to FIG. 4 when the port connector 504 is connected to a port on the computing device 300 (e.g., with the FPGA connection 606a configured to transmit Power Mode (PMode) signals, Module Present (ModPrsL) signals, Power (Vcc) signals, Module Select (ModSelL) signals, Module Reset (ResetL) signals, and/or other signals that would be apparent to one of skill in the art in possession of the present disclosure.) The audible beacon chassis 502 also houses serializer/deserializer (SerDes) drivers 608 that are coupled to the controller 606, and that may include SerDes connections 608a to the port connector 504 and the connector 602. As will be appreciated by one of skill in the art in possession of the present disclosure, the SerDes connection 608a on the port connector 504 may be configured to connect to a Network Processing Unit (NPU) in the computing device 300 (e.g., an NPU that is included in the processing system 400 discussed above with reference to FIG. 4). However, while a particular audible beacon system 600 has been described, one of skill in the art in possession of the present disclosure will appreciate how the audible beacon system of the present disclosure may include other components and/or component configurations while remaining within the scope of the present disclosure as well.

Figure 7:
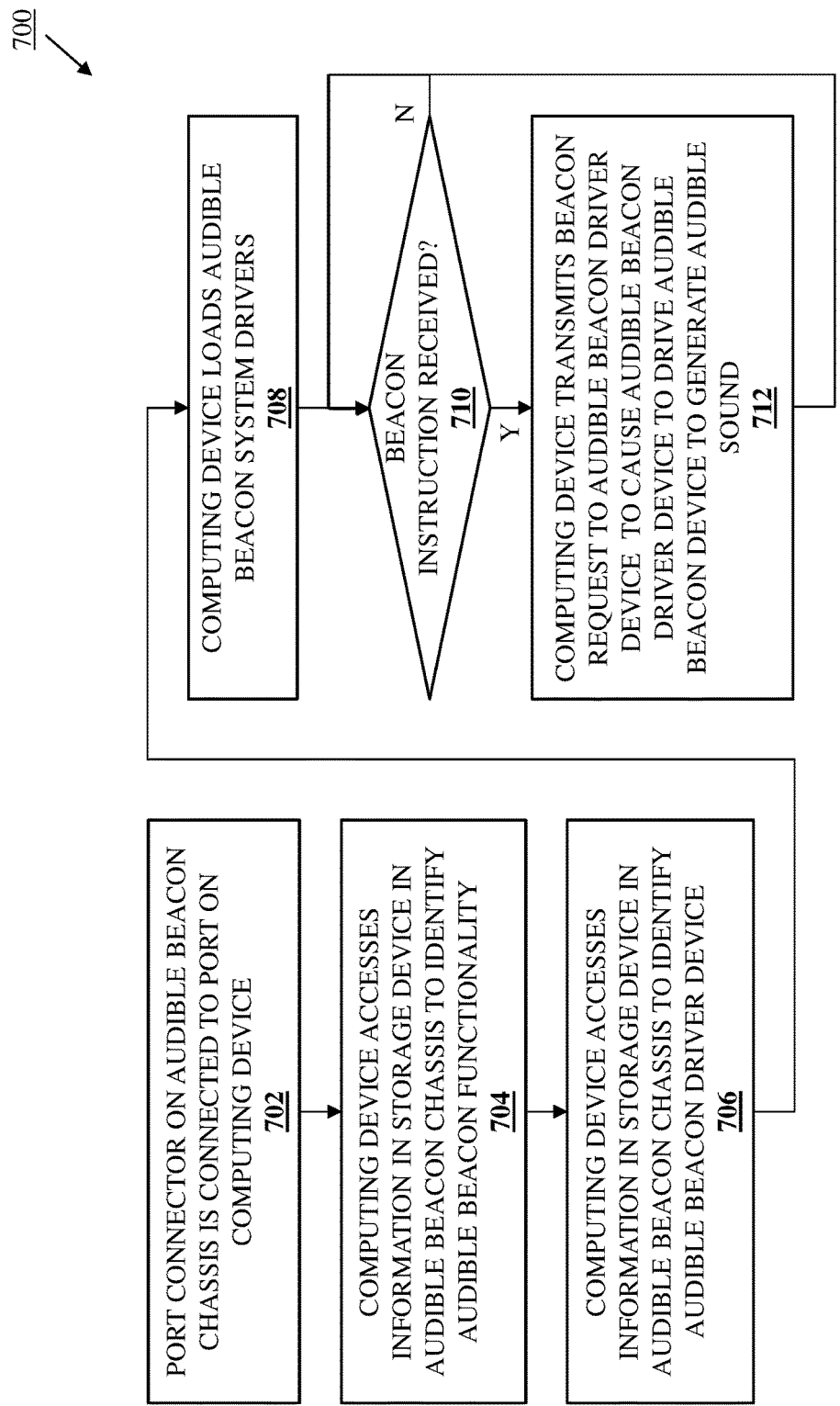
FIG. 7 is a flow chart illustrating an embodiment of a method for providing an audible beacon.

Referring now to FIG. 7, an embodiment of a method 700 for providing an audible beacon is illustrated. As discussed below, the systems and methods of the present disclosure provide for the generation of audible noise as a beacon to locate a computing device and/or a port on a computing device. For example, the audible beacon system of the present disclosure may include an audible beacon chassis. A port connector is included on the audible beacon chassis and is configured to connect to a port on a computing device. An audible beacon device is coupled to the audible beacon chassis. An audible beacon driver device is included in the audible beacon chassis, is accessible via the port connector, and is configured to drive the audible beacon device to cause the audible beacon device to generate an audible sound. A storage device is included in the audible beacon chassis, is accessible via the port connector, and includes information that is configured to allow a computing device that is connected to the port connector to access the audible beacon driver device and cause the audible beacon driver device to drive the audible beacon device. As such, audible beacons may be provided on ports on computing devices and used to locate those computing devices and/or those ports, eliminating many of the issues associated with the visual beacon discussed above.

Figure 8A:
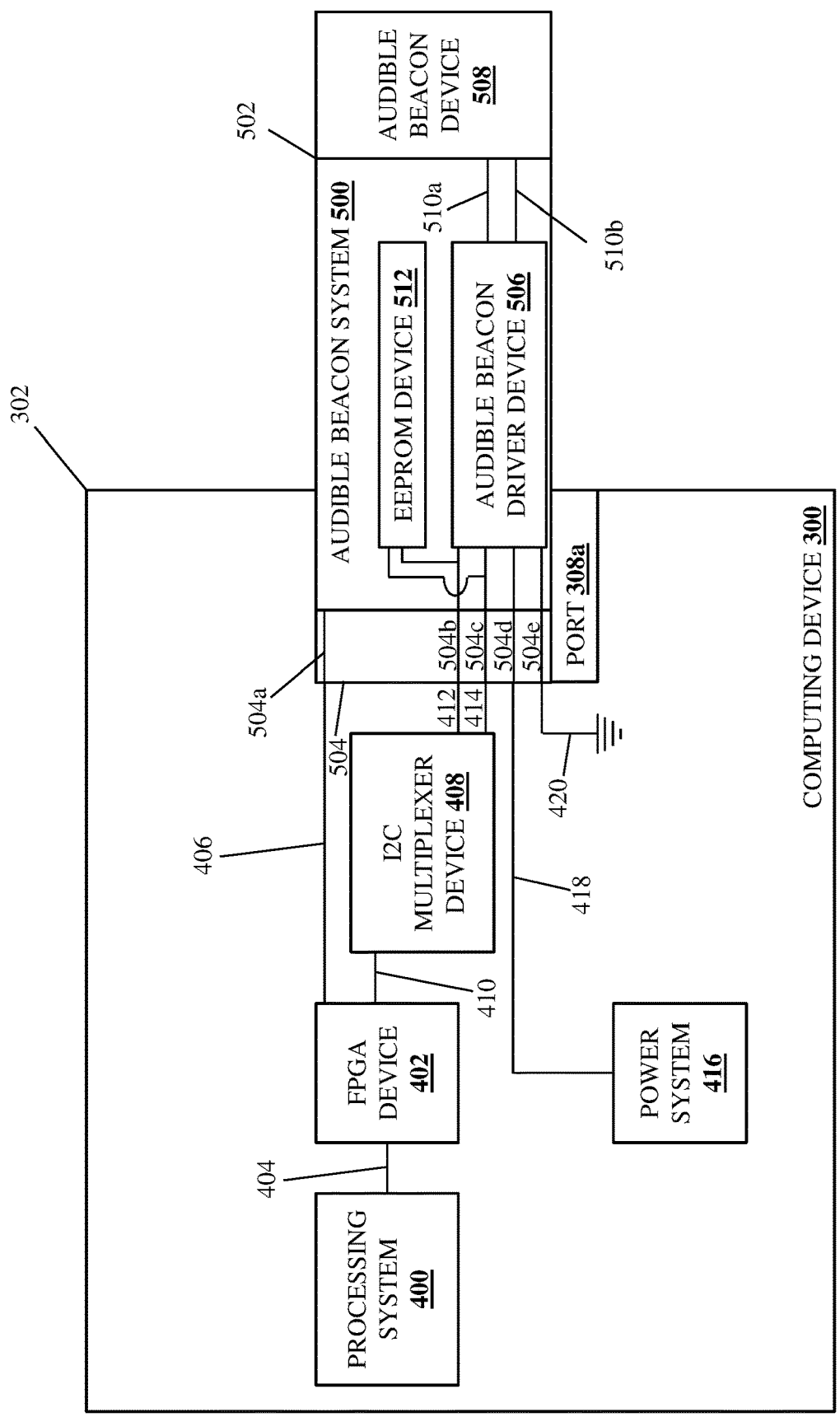
FIG. 8A is a schematic view illustrating an embodiment of the audible beacon system of FIG. 5 connected to the embodiment of the computing device of FIG. 4 during the method of FIG. 7.

The method 700 begins at block 702 where a port connector on an audible beacon chassis is connected to a port on a computing device. With reference to FIG. 8A, in an embodiment of block 702, the audible beacon system 500 discussed above with reference to FIG. 5 may be connected to the port 308a on the computing device discussed above with reference to FIGS. 3 and 4. For example, the audible beacon system 500 may be positioned adjacent the port 308a on the computing device 300 such that the port connector 504 is located immediately adjacent the port 308a, and then moved towards the computing device 300 such that the port connector 504 enters and connects to the port 308a. As can be seen in FIG. 8A, with the port connector 504 connected to the port 308a, the ModPrsL connector element 504a, SCL connector element 504b, SDL connector element 504c, Vcc connector element 504d, and GND connector element 504e on the port connector 504 are coupled to the ModPrsL connection 406, SCL connection 412, SDL connection 414, Vcc connection 418, and GND connection 420, respectively, in the computing device 300. While not illustrated or described in detail herein, one of skill in the art in possession of the present disclosure will recognize how the audible beacon system 600 may be connected to the computing device 300 in a similar manner, with the computing device 300 including corresponding connections that couple the FPGA connection 606a on the audible beacon system 600 to the FPGA device 402 in the computing device 300, and that couple the SerDes connections 608a on the audible beacon system 600 to the processing system 400 (e.g., an NPU) in the computing device 300.

Figure 8B:
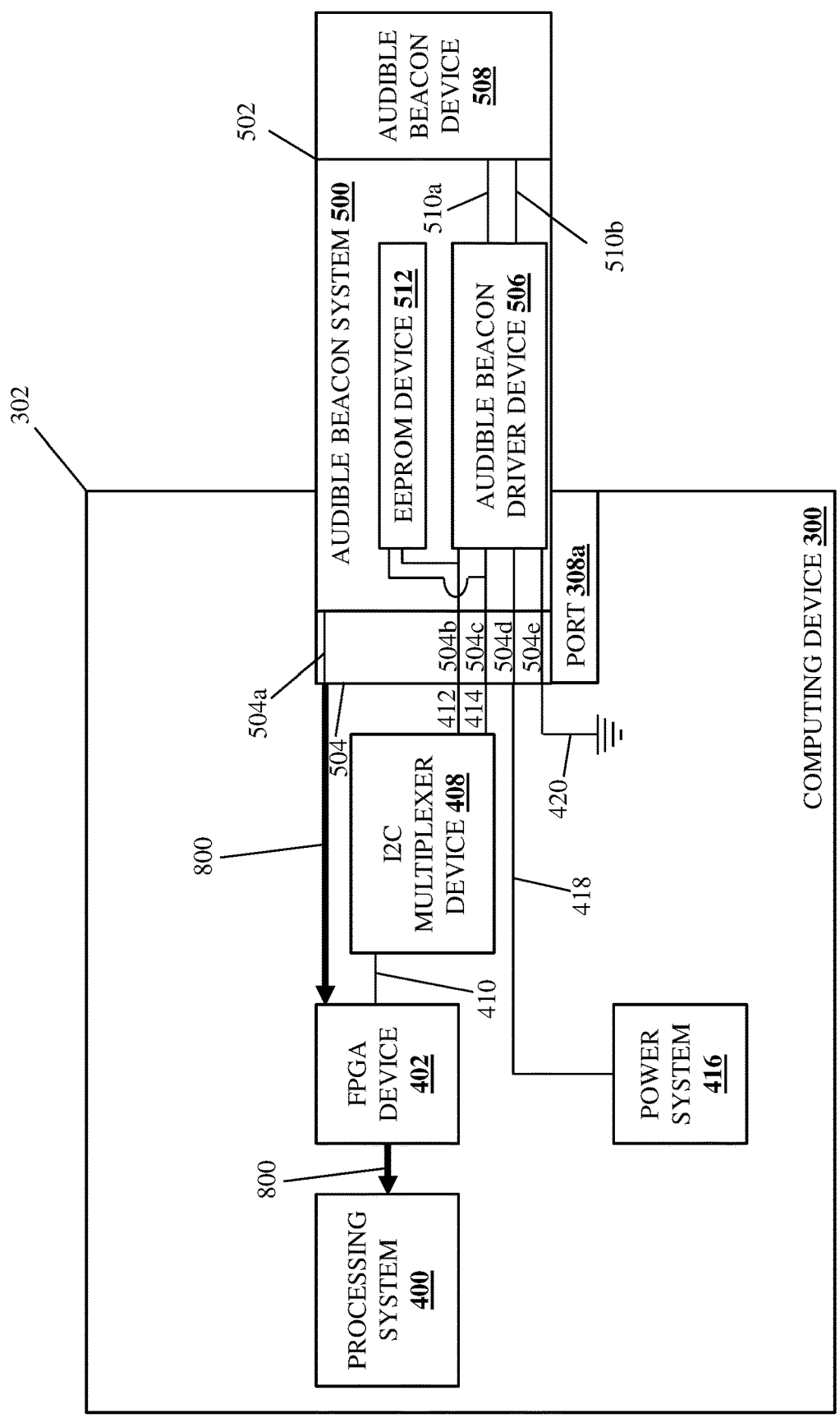
FIG. 8B is a schematic view illustrating an embodiment of the audible beacon system and the computing device of FIG. 8A operating during the method of FIG. 7.

With reference to FIG. 8B, the connection of the audible beacon system 500 to the port 308a on the computing device 300, and the corresponding coupling of the ModPrsL connector element 504a on the port connector 504 with the ModPrsL connection 406 in the computing device 300, will result in module present reporting operations 800 that include the generation and transmission of a module present signal via the ModPrsL connection 406, the FPGA device 402, and the PCIe connection 404 to the processing system 400. As will be appreciated by one of skill in the art in possession of the present disclosure, in response to receiving the module present signal, the audible beacon control engine 304 provided by the processing system 400 will detect the presence of the audible beacon system 500. Furthermore, while not described in detail herein, one of skill in the art in possession of the present disclosure will recognize how the audible beacon control engine 304 may detect the presence of the audible beacon system 600 in a similar manner while remaining within the scope of the present disclosure as well. Further still, while an audible beacon system is illustrated and described as being connected to only a single port on the computing device 202a/300, one of skill in the art in possession of the present disclosure will recognize that multiple audible beacon systems may be coupled to respective ports on the computing device 202a/300 while remaining within the scope of the present disclosure as well.

Figure 8C:
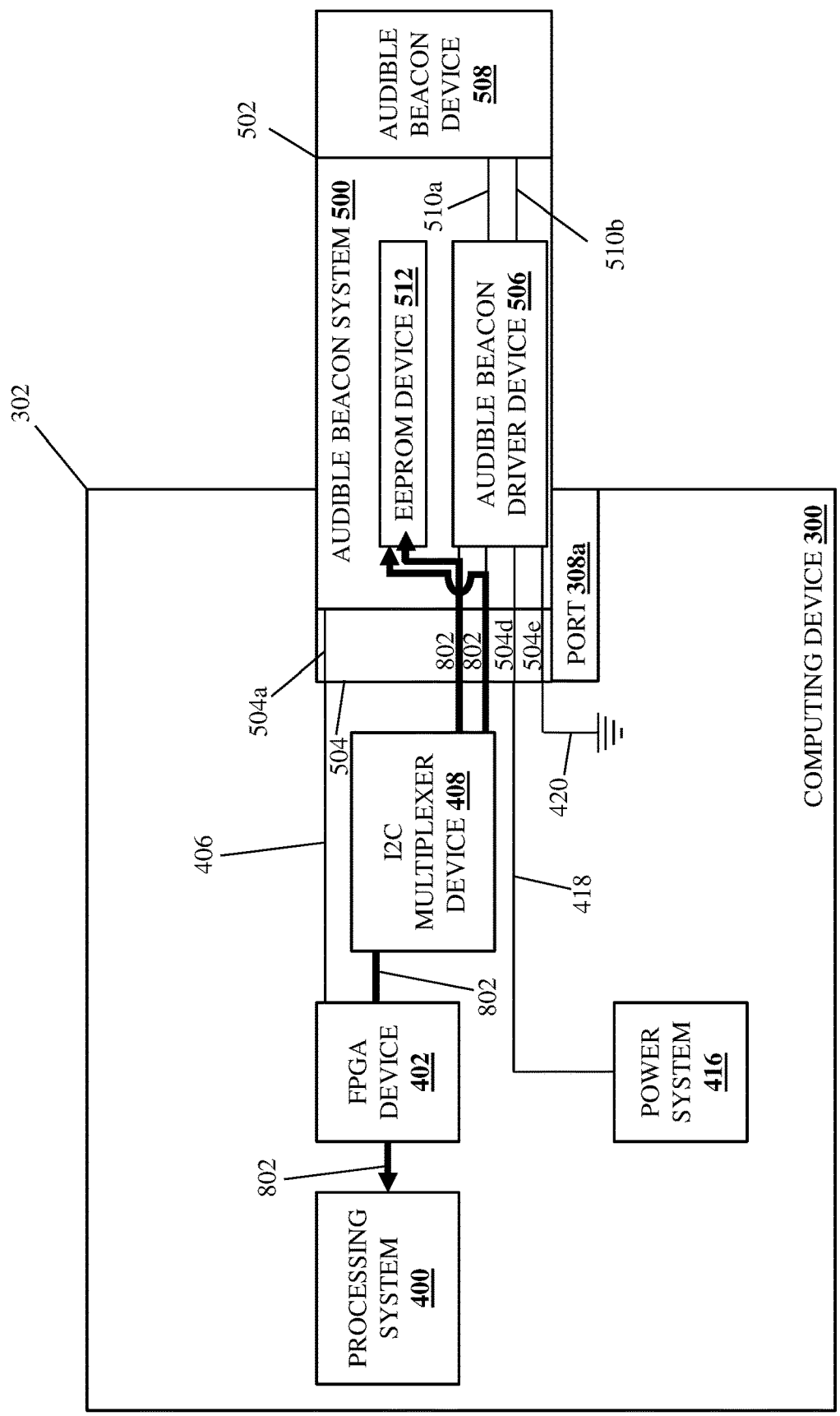
FIG. 8C is a schematic view illustrating an embodiment of the audible beacon system and the computing device of FIG. 8A operating during the method of FIG. 7.

The method 700 then proceeds to block 704 where the computing device accesses information in a storage device in the audible beacon chassis to identify audible beacon functionality. With reference to FIG. 8C, in an embodiment of block 704, the audible beacon control engine 304 provided by the processing system 400 may perform storage device access operations 802 that include accessing the EEPROM device 512 in the audible beacon system 500 via the PCIe connection 404, the FPGA device 402, the I2C connection 410, the I2C multiplexer device 408, the SCL connection 412/SCL connector element 504b, and the SDL connection 414/SDL connector element 504c. For example, the EEPROM device 512 may be associated with an I2C address (e.g., a "standard" EEPROM I2C address such as "0x50" that is conventionally used for EEPROM devices in optics transceiver devices), and the audible beacon control engine 304 may be configured to perform the storage device access operations 802 at that I2C address in response to receiving the module present signal discussed above.

Furthermore, as discussed above, the EEPROM device 512 may store information that identifies the audible beacon system 500 as a device with audible beacon functionality, which one of skill in the art in possession of the present disclosure will recognize may allow the audible beacon control engine 304 to determine that the device connected to its port 308a is configured to operate as an audible beacon (e.g., rather than as a transceiver device that the port is configured to receive as well). Furthermore, while not described in detail herein, one of skill in the art in possession of the present disclosure will recognize how the audible beacon control engine 304 may detect the audible beacon functionality and the transceiver functionality of the audible beacon system 600 in a similar manner while remaining within the scope of the present disclosure as well, and one of skill in the art in possession of the present disclosure will recognize how the audible beacon control engine 304 may turn off a low power mode available in the audible beacon system 600 in the event the transceiver functionality and the audible beacon functionality requires more power than is available in such a low power mode.

The method 700 then proceeds to block 706 where the computing device accesses information in the storage device in the audible beacon chassis to identify an audible beacon driver device. With continued reference to FIG. 8C, in an embodiment of block 706 and in response to identifying the audible beacon functionality of the audible beacon system 500, the audible beacon control engine 304 provided by the processing system 400 may continue to perform the storage device access operations 802 to identify the audible beacon driver device 506 in the audible beacon system 500. For example, the audible beacon driver device 506 may be associated with an I2C address (e.g., an I2C address such as "0x60") that is stored in the EEPROM device 512, and in response to identifying the audible beacon functionality of the audible beacon system 500, the audible beacon control engine 304 may retrieve the I2C address of the audible beacon driver device 506 and may store the I2C address of the audible beacon driver device 506 in the audible beacon control database 306. In another example, in response to identifying the audible beacon driver device 506, the audible beacon control engine 304 may communicate with the audible beacon driver device 506 to determine the capabilities of the audible beacon device 508. Furthermore, while not described in detail herein, one of skill in the art in possession of the present disclosure will recognize how the audible beacon control engine 304 may identify the audible beacon driver device 506 in the audible beacon system 600 in a similar manner while remaining within the scope of the present disclosure as well.

The method 700 then proceeds to block 708 where the computing device loads audible beacon system drivers. In an embodiment, at block 708 and in response to detecting the audible beacon functionality of the audible beacon system 500 and identifying the audible beacon driver device 506 in the audible beacon system 500, the audible beacon control engine 304 provided by the processing system 400 may access audible beacon system drivers (e.g., stored in the audible beacon control database 306, available via the network 204, etc.), and load those audible beacon system drivers in the audible beacon control engine 304 so that the audible beacon control engine 304 is configured to control the audible beacon system 500 as discussed below. For example, one of skill in the art in possession of the present disclosure will recognize that the information stored in the EEPROM device 512 may include information that allows the audible beacon control engine 304 to identify the appropriate audible beacon system drivers for the audible beacon system 500, and thus the storage device access operations 802 discussed above may allow the audible beacon control engine 304 to determine a location of those audible beacon system drivers so that it may retrieve and load those audible beacon system drivers as discussed above. Furthermore, while not described in detail herein, one of skill in the art in possession of the present disclosure will recognize how the audible beacon control engine 304 may load audible beacon system drivers for the audible beacon system 600 in a similar manner while remaining within the scope of the present disclosure as well.

The method 700 then proceeds to decision block 710 where it is determined whether a beacon instruction has been received. In an embodiment, at decision block 710, the audible beacon control engine 304 provided by the processing system 400 may determine whether a beacon instruction has been received. For example, a user of the management device 206 may attempt to locate the computing device 202a/300 and/or its port 308a by generating and transmitting a beacon instruction via the network 204 and to the computing device 202a/300 that is configured to cause the computing device to activate audible beacon system(s) that are connected to its port(s). To provide a specific example, a user of the management device 206 may determine whether the computing device 202a/300 has audible beacon system(s) connected to its port(s) by generating and transmitting a "show inventory media" command via the network 204 to the computing device 202a/300, and in response to receiving that command via the communication system 308, the audible beacon control engine 304 may respond (e.g., through its communication system 308 and via the network 204 to the management device 206) with the following:
audible-beacon system {node-id|node-id/unit-id} {on|off} {db<dB>}
audible-beacon interface ethernet {chassis/slot/port[: subport]} {on|off} {db<dB>}

As will be appreciated by one of skill in the art in possession of the present disclosure, the information above may allow a user of the management device 206 to determine whether a computing device in the networked system 200 includes any audible beacon system(s) connected to its port(s), as well as configure a beacon instruction to activate any audible beacon systems connected to ports on a computing device if that computing device or its ports must be located. If, at decision block 706, it is determined that a beacon instruction has not been received, the method 700 returns to decision block 710. As such, the method 700 may loop such that the audible beacon control engine 304 provided by the processing system 400 continues to monitor for a beacon instruction (e.g., from the management device 206) until a beacon instruction is received.

Figure 8D:
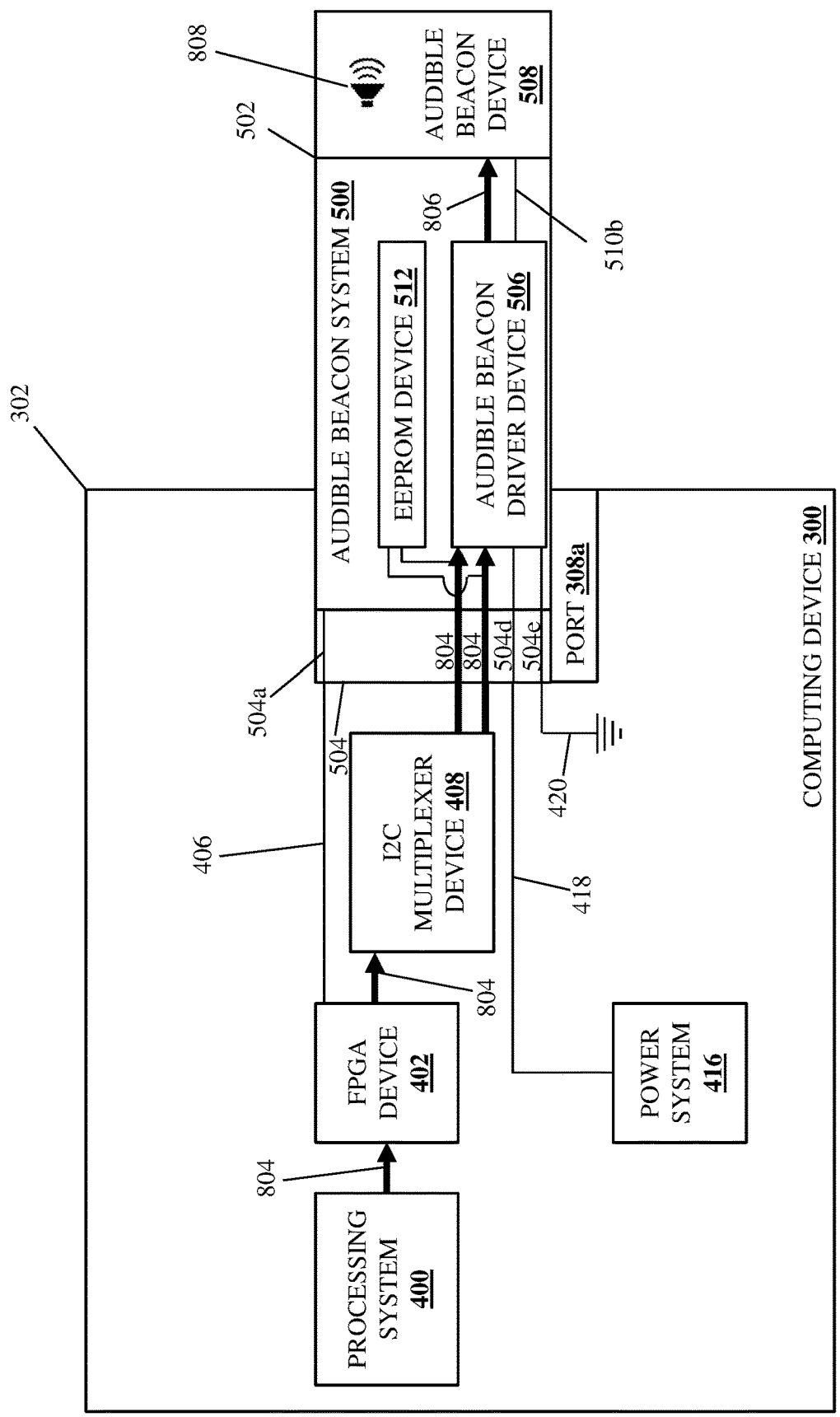
FIG. 8D is a schematic view illustrating an embodiment of the audible beacon system and the computing device of FIG. 8A operating during the method of FIG. 7.

If at decision block 710, it is determined that a beacon instruction has been received, the method 700 proceeds to block 712 where the computing device transmits a beacon request to the audible beacon driver device to cause the audible beacon driver device to drive an audible beacon device to generate audible sound. With reference to FIG. 8D, in an embodiment of block 712 and in response to receiving a beacon instruction (e.g., via the network 204 from the management device 206), the audible beacon control engine 304 provided by the processing system 400 may perform beacon request transmission operations 804 that may include generating and transmitting a beacon request via the PCIe connection 404, the FPGA device 402, the I2C connection 410, the I2C multiplexer device 408, the SCL connection 412/SCL connector element 504b, and the SDL connection 414/SDL connector element 504c, to the audible beacon driver device 506. For example, at block 712 the audible beacon control engine 304 may utilize the audible beacon system drivers loaded at block 708, the I2C address of the audible beacon driver device 506 retrieved at block 706, the capabilities of the audio beacon device 508 identifies at block 706, and/or other information in order to generate and transmit commands, instructions, and/or other communications to the audible beacon driver device 506 that one of skill in the art in possession of the present disclosure would recognize as providing a beacon request to active the audible beacon system 500 as discussed below.

With continued reference to FIG. 8D, in response to receiving the beacon request, the audible beacon driver device 506 may perform audible beacon device activation operations 806 that may include driving or otherwise activating the audible beacon device 508 in order to cause the audible beacon device 508 to produce an audible sound (as illustrated by the element 808 in FIG. 8D). In a specific example in which the audible beacon device 508 is a piezoelectric audio device (e.g., a piezoelectric "buzzer"), the audible beacon device activation operations 806 may include the audible beacon driver device 506 providing a voltage to the piezoelectric audio device to cause it to vibrate and produce audible sound, although one of skill in the art in possession of the present disclosure will appreciate how other audio devices that are configured to produce sound may be utilized while remaining within the scope of the present disclosure as well. Furthermore, while not described in detail herein, one of skill in the art in possession of the present disclosure will recognize how the audible beacon control engine 304 may cause the audible beacon system 600 to produce an audible sound in a similar manner while remaining within the scope of the present disclosure as well, with the audible beacon system 600 also configured to perform any of a variety of transceiver operations while connected to the port 308a as discussed above.

One of skill in the art in possession of the present disclosure will appreciate how the audible sound produced by the audible beacon device 508 may be utilized by the user of the management device 206 to locate the computing device 202a/300 and/or the port 308 to which the audible beacon system 500 is connected. Furthermore, the audible beacon system of the present disclosure may be utilized along with the visual beacons discussed above (e.g., system LEDs, port LEDs, etc.) and/or port numbering provided on the outer surface of the chassis 302 of the computing device 300, which may allow a user to generally locate a computing device and/or its port using audible sound, and then pinpoint the location of the computing device and/or its port via visual indications provided by activated LEDs and/or port numbering. The method 700 may then return to decision block 710, which one of skill in the art in possession of the present disclosure will recognize allows another beacon instruction to be provided to the computing device 202a/300 in order to activate the audible beacon system 500 again. As discussed above, the audible beacon system 500 may be utilized to produce different audible sounds and, as such, a first audible sound produced by the audible beacon system 500 on a first iteration of blocks 710 and 712 of the method 700 may be different than a second audible sound produced by the audible beacon system 500 on a second iteration of blocks 7109 and 712 of the method 700.

Thus, systems and methods have been described that provide for the generation of audible noise as a beacon to locate a switch device and/or a port on a switch device. For example, the audible beacon system of the present disclosure may include an audible beacon chassis. A port connector is included on the audible beacon chassis and is configured to connect to a port on a switch device. An piezoelectric buzzer is coupled to the audible beacon chassis. An audible beacon driver device is included in the audible beacon chassis, is accessible via the port connector, and is configured to drive the piezoelectric buzzer to cause the piezoelectric buzzer to generate an audible sound. A storage device is included in the audible beacon chassis, is accessible via the port connector, and includes information that is configured to allow a switch device that is connected to the port connector to access the audible beacon driver device and cause the audible beacon driver device to drive the piezoelectric buzzer. As such, audible beacons may be provided on ports on switch devices and used to locate those switch devices and/or those ports, eliminating many of the issues associated with the visual beacon discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An audible beacon system, comprising:
an audible beacon chassis;
a port connector that is included on the audible beacon chassis and that is configured to connect to a port on a computing device;
an audible beacon device that is coupled to the audible beacon chassis;
an audible beacon driver device that is included in the audible beacon chassis, that is accessible via the port connector, and that is configured to drive the audible beacon device to cause the audible beacon device to generate an audible sound; and a storage device that is included in the audible beacon chassis, that is accessible via the port connector, and that includes information that is configured to allow a computing device that is connected to the port connector to access the audible beacon driver device and cause the audible beacon driver device to drive the audible beacon device.

2. The system of claim 1, wherein the audible beacon chassis includes a transceiver chassis form-factor, and the port connector is a transceiver connector.

3. The system of claim 1, wherein the audible beacon device is a piezoelectric audio device.

4. The system of claim 1, wherein the information in the storage device is configured to identify the audible beacon system to a computing device that is connected to the port connector.

5. The system of claim 1, wherein the audible beacon chassis is a transceiver chassis and houses a transceiver subsystem that is configured to transmit and receive data.

6. The system of claim 5, further comprising:
a decoupling element that extends from the transceiver chassis and that is configured to decouple the port connector from a port on a computing device, wherein the audible beacon device is included on the decoupling element.

7. An Information Handling System (IHS), comprising:
a port;
an audible beacon system that includes:
an audible beacon chassis;
a port connector that is included on the audible beacon chassis and that is connected to the port;
an audible beacon device that is coupled to the audible beacon chassis;
an audible beacon driver device that is included in the audible beacon chassis and that is accessible via the port connector; and
a storage device that is included in the audible beacon chassis and that accessible via the port connector;
a processing system that is coupled to the port; and
a memory system that is coupled to the processing system and that includes instructions that, when executed by the processing system, cause the processing system to provide an audible beacon control engine that is configured to:
detect the connection of the audible beacon system to the port and, in response, access information in the storage device that identifies the audible beacon driver device;
receive a beacon request; and
drive, in response to receiving the beacon request, the audible beacon driver device to cause the audible beacon device to generate an audible sound.

8. The IHS of claim 7, wherein the audible beacon chassis includes a transceiver chassis form-factor, the port connector is a transceiver connector, and the port is a transceiver port.

9. The IHS of claim 7, wherein the audible beacon device is a piezoelectric audio device.

10. The IHS of claim 7, wherein audible beacon control engine is configured to:
access, in response detecting the connection of the audible beacon system to the port, the information in the storage device to identify the audible beacon system, wherein the audible beacon control engine accesses the information in the storage device that identifies the audible beacon driver device in response to identifying the audible beacon system.

11. The IHS of claim 7, wherein the audible beacon chassis is a transceiver chassis and houses a transceiver subsystem that is configured to transmit and receive data.

12. The IHS of claim 11, further comprising:
a decoupling element that extends from the transceiver chassis and that is configured to decouple the port connector from the port, wherein the audible beacon device is included on the decoupling element.

13. The IHS of claim 7, wherein the beacon request is a first beacon request and the audible sound is a first audible sound, and wherein the audible beacon control engine is configured to:
receive a second beacon request; and
drive, in response to receiving the second beacon request, the audible beacon driver device to cause the audible beacon device to generate a second audible sound that is different than the first audible sound.

14. A method for providing an audible beacon, comprising:
connecting, by a port connector that is included on an audible beacon chassis, to a port on a computing device;
providing, to the computing device by a storage device that is included in the audible beacon chassis and that is accessible via the port connector, access to information that identifies an audible beacon driver device that is included in the audible beacon chassis and that is accessible via the port connector;
receiving, by the audible beacon driver device from the computing device via the port connector, a beacon request; and
driving, by the audible beacon driver device in response to receiving the beacon request, an audible beacon device that is included in the audible beacon chassis to cause the audible beacon device to generate an audible sound.

15. The method of claim 14, wherein the audible beacon chassis includes a transceiver chassis form-factor, the port connector is a transceiver connector, and the port is a transceiver port.

16. The method of claim 14, wherein the audible beacon device is a piezoelectric audio device.

17. The method of claim 14, further comprising:
providing, to the computing device by the storage device in response the computing device detecting the connection of the port connector to the port, access to the information that identifies the audible beacon system, wherein the computing device accesses the information in the storage device that identifies the audible beacon driver device in response to identifying the audible beacon system.

18. The method of claim 14, wherein the audible beacon chassis is a transceiver chassis and houses a transceiver subsystem that is configured to transmit and receive data.

19. The method of claim 18, wherein a decoupling element extends from the transceiver chassis and the audible beacon device is included on the decoupling element, and wherein the method further comprises:
decoupling, by the decoupling element in response to actuation of the decoupling element, the port connector from the port.

20. The method of claim 14, wherein the beacon request is a first beacon request and the audible sound is a first audible sound, and wherein the method further comprises:

receiving, by the audible beacon driver device from the computing device via the port connector, a second beacon request; and driving, by the audible beacon driver device in response to receiving the second beacon request, the audible beacon device to generate a second audible sound that is different than the first audible sound.

\* \* \* \* \*